US012798650B2

(12) United States Patent
Nakaura

(10) Patent No.: US 12,798,650 B2
(45) Date of Patent: Nov. 17, 2026

(54) COUPLING DEVICE AND AUTOMATIC TRAVELING DEVICE

(71) Applicant: SHARP KABUSHIKI KAISHA, Sakai City (JP)

(72) Inventor: Masaki Nakaura, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 200 days.

(21) Appl. No.: 18/909,300

(22) Filed: Oct. 8, 2024

(65) Prior Publication Data

US 2025/0128748 A1 Apr. 24, 2025

(30) Foreign Application Priority Data

Oct. 20, 2023 (JP) ................................. 2023-181145

(51) Int. Cl.

*B62B 5/00* (2006.01)
*B60D 1/00* (2006.01)
*B60D 1/24* (2006.01)

(52) U.S. Cl.

CPC ............ *B62B 5/0079* (2013.01); *B60D 1/246* (2013.01); *B60D 2001/005* (2013.01)

(58) Field of Classification Search

CPC .. B62B 5/0079; B60D 1/246; B60D 2001/005
USPC .......................................................... 280/508
See application file for complete search history.

(56) References Cited

U.S. PATENT DOCUMENTS 8,894,086 B2 * 11/2014 Ekbote .................. B60D 1/075 280/509
10,787,051 B2 * 9/2020 Miyamoto ............... B60D 1/02
10,894,453 B2 * 1/2021 Fujihara .................. B60D 1/62
11,292,303 B2 * 4/2022 Furuno .................... B60D 1/02
11,298,995 B2 * 4/2022 Sokuza .................... B60D 1/02
2023/0249732 A1 * 8/2023 Kato ..................... B62B 5/0053 180/14.1
2025/0128748 A1 * 4/2025 Nakaura ................. B60D 1/36
2026/0035044 A1 * 2/2026 Newell ................. B62B 5/0033

FOREIGN PATENT DOCUMENTS

JP 2011059859 A * 3/2011
JP 2011189769 A * 9/2011
JP 2013208922 A * 10/2013
JP 5448058 B2 * 3/2014
JP 2014201184 A * 10/2014
JP 6024033 B2 * 11/2016
KR 102709248 B1 * 9/2024 .............. B66F 9/065
KR 20250172259 A * 12/2025 ............... B62D 5/04
KR 20250173223 A * 12/2025 ............... B62B 5/06
KR 20250173374 A * 12/2025 ............... B62D 5/04
WO WO-2024171483 A1 * 8/2024 ............ B61B 13/00
WO WO-2026028161 A1 * 2/2026 ............ B62D 61/10

* cited by examiner

*Primary Examiner* — James A Shriver, II
(74) *Attorney, Agent, or Firm* — ScienBiziP, P.C.

(57) ABSTRACT

A coupling device includes a coupling motor, a gear mechanism connected to the coupling motor, a coupling arm connected to the gear mechanism, and a coupling controller that drives the coupling motor. When an automatic traveling device reaches a predetermined coupling operation position, the coupling controller drives the coupling motor to rotate the gear mechanism, thereby moving the coupling arm from a non-coupling position to a coupling position for coupling a cart.

9 Claims, 15 Drawing Sheets

D1

| OPERATION ORDER | MARKER NUMBER | TRAVELING OPERATION | SPEED (m/min) | SPECIFIC OPERATION |
|---|---|---|---|---|
| 1 | 2 | FORWARD | 10 | - |
| 2 | 3 | FORWARD | 30 | - |
| 3 | 4 | RIGHT SPIN | 20 | - |
| 4 | 5 | RIGHT SPIN | 20 | - |
| 5 | 6 | FORWARD | 10 | - |
| 6 | 7 | STOP | 0 | CART COUPLING |
| 7 | 8 | RIGHT FOLLOWING | 20 | - |
| 8 | 9 | RIGHT FOLLOWING | 20 | - |
| 9 | 1 | CENTER FOLLOWING | 20 | - |
| 10 | 2 | LINE STOP | 0 | CHARGING |

FIG. 4

COUPLING DEVICE AND AUTOMATIC TRAVELING DEVICE

INCORPORATION BY REFERENCE

This application is based upon and claims the benefit of priority from the corresponding Japanese Patent Application No. 2023-181145 filed on Oct. 20, 2023, the entire contents of which are incorporated herein by reference.

BACKGROUND

The disclosure relates to a coupling device and an automatic traveling device capable of coupling a towed vehicle such as a cart.

In the related art, an automatic traveling device (such as an AGV or a traveling vehicle) is known that can travel to a destination along a preset travel route. An automatic traveling device is also known that includes a coupling device that can be coupled to a cart (towed vehicle), and that can travel while towing the cart by coupling the coupling device to the cart.

The automatic traveling device in the related art includes two independent coupling devices on the left and right sides, and has a structure in which the left coupling device is driven to couple a left arm to a left pipe of the cart, and the right coupling device is driven to couple a right arm to a right pipe of the cart. Thus, the automatic traveling device in the related art poses the problem of having a complicated structure since two coupling devices are provided independently on the automatic traveling device.

SUMMARY

An object of the disclosure is to provide a coupling device and an automatic traveling device capable of coupling a towed vehicle with a simple structure.

A coupling device according to one aspect of the disclosure is a device that is mounted on an automatic traveling device and is capable of coupling a towed vehicle. The coupling device includes a drive motor, a gear mechanism connected to the drive motor, a coupling arm connected to the gear mechanism, and a controller that drives the drive motor. When the automatic traveling device reaches a predetermined coupling operation position, the controller drives the drive motor to rotate the gear mechanism, thereby moving the coupling arm from a non-coupling position to a coupling position at which the coupling arm is coupled to the towed vehicle.

An automatic traveling device according to another aspect of the disclosure includes a coupling device that includes a drive motor, a gear mechanism connected to the drive motor, a coupling arm connected to the gear mechanism, and a controller that drives the drive motor, and is capable of coupling a towed vehicle. The automatic traveling device includes an output processor that outputs a drive signal to the coupling device when the automatic traveling device reaches a coupling operation position at which the automatic traveling device performs an operation to couple the towed vehicle. When the controller receives the drive signal, the controller drives the drive motor to rotate the gear mechanism, thereby moving the coupling arm from a non-coupling position to a coupling position at which the coupling arm is coupled to a coupling portion of the towed vehicle.

According to the disclosure, it is possible to provide a coupling device and an automatic traveling device capable of coupling a towed vehicle with a simple structure.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a diagram illustrating an example of control information to be used in the automatic traveling device according to the embodiment of the disclosure.

DETAILED DESCRIPTION

Embodiments of the disclosure will be described below with reference to the drawings. Note that the following embodiments are specific examples of the disclosure, and do not limit the technical scope of the disclosure.

Figure 1:
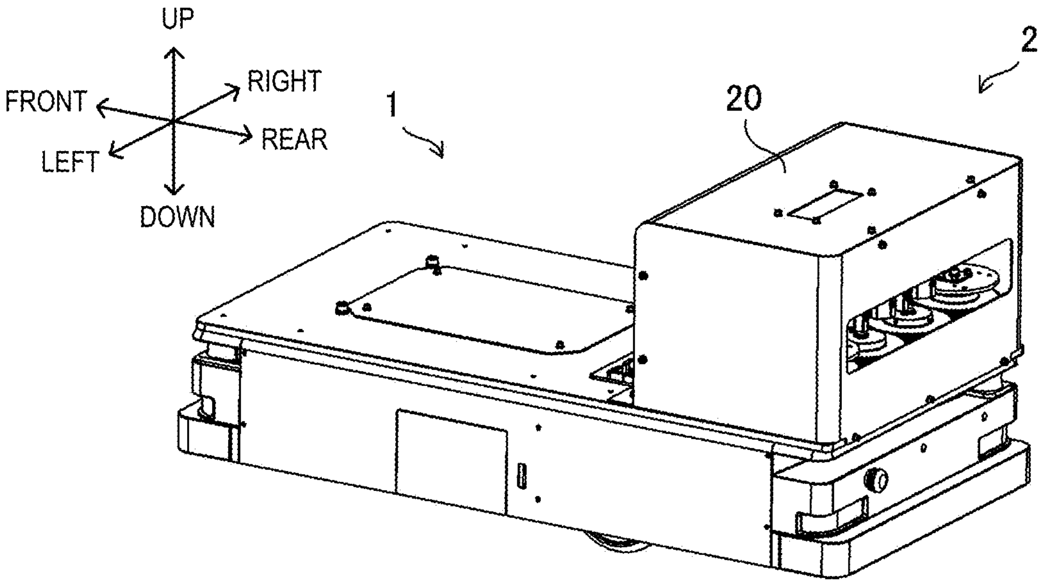
FIG. 1 is an external perspective view of an automatic traveling device according to an embodiment of the disclosure.

FIG. 1 illustrates an external appearance of an automatic traveling device 1 according to this embodiment. The automatic traveling device 1 is employed in facilities such as warehouses and production lines. The automatic traveling device 1 travels along a guide member (i.e., a magnetic tape L) for traveling guide corresponding to a preset course (traveling route) in the facility. Upon detecting a marker M, which is placed on the magnetic tape L with control information (control parameters) set, the automatic traveling device 1 performs an operation according to the control information. The magnetic tape L and the marker M are placed on a floor surface of the facility by the user based on the course. Note that the automatic traveling device of the disclosure does not need to have a function of detecting the marker M.

Figure 2:
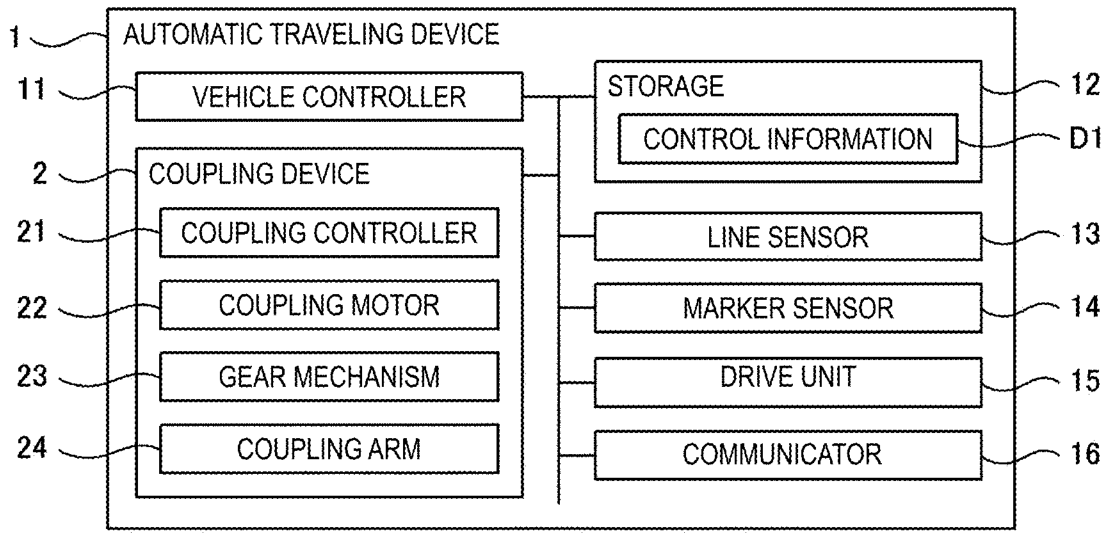
FIG. 2 is a block diagram illustrating a configuration of the automatic traveling device according to the embodiment of the disclosure.

FIG. 2 is a function block diagram illustrating a configuration of the automatic traveling device 1. As illustrated in FIG. 2, the automatic traveling device 1 includes a vehicle controller 11, a storage 12, a line sensor 13, a marker sensor 14, a driver 15, a communicator 16, a coupling device 2, and the like. The coupling device 2 is a device that is installed on a top plate of the automatic traveling device 1 and couples a cart 3 (an example of a towed vehicle of the disclosure). When the coupling device 2 is coupled to the cart 3 (see FIG. 6), the automatic traveling device 1 travels while towing the cart 3. The coupling device 2 is connected to the automatic traveling device 1 via wire or wirelessly so as to enable data communication with the automatic traveling device 1.

The communicator 16 is a communication interface for wirelessly connecting the automatic traveling device 1 to a communication network and for executing data communication in accordance with a predetermined communication protocol with external devices such as an operation terminal and a server via the communication network.

The driver 15 includes left and right drive wheels, a traveling motor, a battery, and the like. The driver 15 drives the traveling motor using power from the battery and rotates the drive wheels with the driving force of the traveling motor to travel the automatic traveling device 1. The battery is a rechargeable battery and is charged using an automatic charger (not illustrated). For example, the automatic traveling device 1 can charge the battery using the automatic charger at a predetermined charging position while traveling on a set course.

Figure 3:
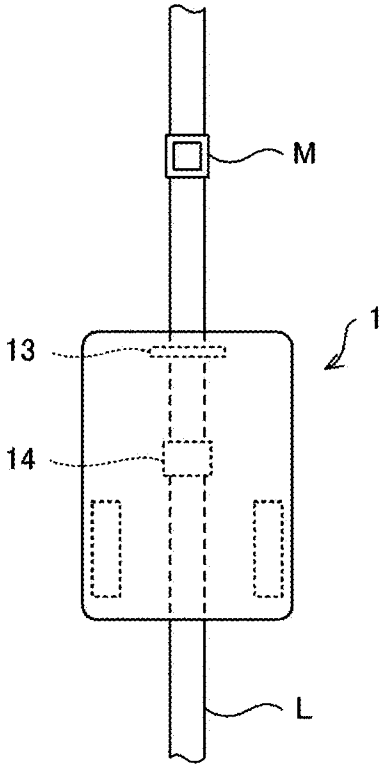
FIG. 3 is a diagram describing a traveling method of the automatic traveling device according to the embodiment of the disclosure.

The line sensor 13 is a detection sensor that detects the magnetic tape L placed on the floor surface of the facility. FIG. 3 schematically illustrates the magnetic tape L and the marker M placed on the floor surface of the facility, and the automatic traveling device 1 that travels in the facility. As illustrated in FIG. 3, the line sensor 13 is provided on a bottom surface of the automatic traveling device 1, and includes multiple detection elements (not illustrated) arrayed in a line in a direction perpendicular to a traveling direction of the automatic traveling device 1. Each detection element outputs a detection signal when the magnetic tape L is present at a position facing the detection element.

The marker sensor 14 detects the marker M placed on the course. As illustrated in FIG. 3, the marker sensor 14 is provided at a position where the marker sensor 14 can face the marker M while the automatic traveling device 1 is traveling. An RFID sensor that can communicate with an RFID tag is used for the marker sensor 14, corresponding to the RFID tag used for the marker M. Note that as long as communication with the marker M is possible, the marker sensor 14 may be located at a position away from the position facing the marker M. The marker sensor 14 can be changed appropriately depending on a type of the communication tag used as the marker M. Alternatively, the marker M may be a two-dimensional code, and the marker sensor 14 may be a camera capable of reading the two-dimensional code.

In the marker M, identification information (such as a marker number or a marker ID) of the marker M is recorded in a readable state. For example, the marker sensor 14 detects the marker M placed on the course to acquire the marker number recorded in the marker M. To be specific, the marker sensor 14 acquires the marker number recorded in the marker M by communicating with the marker M while the automatic traveling device 1 is traveling.

By using a communication tag such as an RFID tag as the marker M, communication can be carried out between the marker sensor 14 and the marker M for a predetermined period while the marker sensor 14 passes near the marker M (a period longer than a period during which the marker sensor 14 faces the marker M). Therefore, even while the automatic traveling device 1 is traveling, the marker number recorded in the marker M can be acquired accurately. The vehicle controller 11 acquires the marker number from the marker sensor 14.

The storage 12 is a non-volatile storage such as a hard disk drive (HDD), a solid state drive (SSD), or a flash memory that stores various types of information. The storage 12 stores data such as control information D1.

FIG. 4 is a diagram illustrating an example of the control information D1. The control information D1 is information that defines traveling operations of the automatic traveling device 1. As illustrated in FIG. 4, the control information D1 includes information such as "operation order", "marker number", "traveling operation", "speed", and "specific operation". The operation order is information indicating the order of the traveling operation of the automatic traveling device 1. For example, the automatic traveling device 1 performs the traveling operations in the order from No. 1 to No. 10. The marker number is identification information of the marker M and corresponds to a marker number recorded in the marker M. Instead of the marker number, a marker ID may be registered in the control information D1.

The traveling operation is information that represents an operation to be performed by the automatic traveling device 1. "Forward" represents an operation of traveling the automatic traveling device 1 forward. "Right spin" represents an operation of turning the automatic traveling device 1 90 degrees to the right (spin turn). "Right following" represents an operation of turning the automatic traveling device 1 to the right by steering the automatic traveling device 1 to the right by a predetermined angle. "Center following" represents an operation of moving the automatic traveling device 1 forward by steering the automatic traveling device 1 in a center direction. "Stop" represents an operation of stopping the automatic traveling device 1.

The speed is information on the traveling speed of the automatic traveling device 1. The specific operation is information that represents a specific operation to be performed by the automatic traveling device 1. The specific operation includes a charging operation for charging the automatic traveling device 1, a coupling operation for coupling a coupling target (e.g., the cart 3) to the automatic traveling device 1, and the like.

In the control information D1, the operation order, the traveling operation, the speed, and the specific operation are each registered in association with the marker number. The control information D1 is set, for example, in an operation terminal (not illustrated) and is output (transferred) from the operation terminal to the automatic traveling device 1. Upon acquiring the control information D1 from the operation terminal, the automatic traveling device 1 stores the control information D1 in the storage 12, and travels on the set course while performing traveling operations according to the control information D1.

The storage 12 stores control programs that cause the vehicle controller 11 to execute various types of control processing. For example, the control programs are non-temporarily recorded on a computer-readable recording medium such as a CD or a DVD, read by a reading device (not illustrated) provided in the automatic traveling device 1, and stored in the storage 12. Note that the control programs may be distributed from a cloud server and stored in the storage 12.

The vehicle controller 11 includes control devices such as a CPU, a ROM, and a RAM. The CPU is a processor that executes various types of arithmetic processing. The ROM is a non-volatile storage in which control programs such as a BIOS and an OS for causing the CPU to execute various types of arithmetic processing are stored in advance. The RAM is a volatile or non-volatile storage that stores various types of information, and is used as a temporary storage memory (work area) for various types of processing executed by the CPU. Then, the vehicle controller 11 controls the automatic traveling device 1 by executing various control programs stored in advance in the ROM or the storage 12 using the CPU. The vehicle controller 11 functions as the various processors by executing various types of processing in accordance with the control programs using the CPU. Further, some or all of the processors may be composed of an electronic circuit. Note that the control programs may be programs for causing multiple processors to function as the processors.

To be specific, the vehicle controller 11 controls the traveling operation of the automatic traveling device 1. For example, upon acquiring the control information D1 (see FIG. 4) from the operation terminal, the vehicle controller 11 stores the control information D1 in the storage 12. The vehicle controller 11 causes the automatic traveling device 1 to travel along the magnetic tape L based on the detection result by the line sensor 13 (see FIG. 3).

When the marker sensor 14 detects the marker M, the vehicle controller 11 causes the automatic traveling device 1 to perform a traveling operation corresponding to this marker M. To be specific, when the marker sensor 14 detects the marker M and reads the marker number recorded in the marker M, the vehicle controller 11 refers to the control information D1 (see FIG. 4) and causes the automatic traveling device 1 to perform the traveling operation associated with this marker number.

Figure 5:
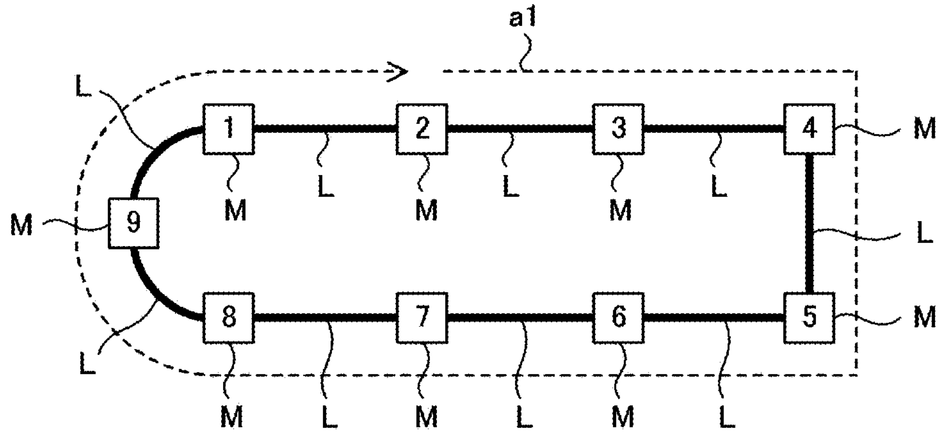
FIG. 5 is a diagram illustrating an example of a course set for the automatic traveling device according to the embodiment of the disclosure.

FIG. 5 illustrates a specific example of a course (traveling route) corresponding to the control information D1 illustrated in FIG. 4. After setting the course and the control information D1, the user places the magnetic tape L on the floor surface of the facility based on the set course, and places the RFID tags corresponding to the markers M on the magnetic tape L. The automatic traveling device 1 starts traveling from a position of the marker number “2” (starting point), proceeds in an arrow direction a1, and stops at the position of the marker number “2” (ending point).

To be specific, upon detecting the marker M with the marker number “2”, the automatic traveling device 1 starts traveling forward at the speed of 10 m/min. Upon detecting the marker M with the marker number “3”, the automatic traveling device 1 changes the speed to 30 m/min and continues traveling forward. Subsequently, upon detecting the marker M with the marker number “4”, the automatic traveling device 1 turns to the right while searching for the magnetic tape L. Upon detecting the magnetic tape L, the automatic traveling device 1 resumes forward movement. Upon detecting the subsequent marker M with the marker number “5”, the automatic traveling device 1 turns further to the right while searching for the magnetic tape L. Upon detecting the magnetic tape L, the automatic traveling device 1 resumes forward movement. Subsequently, upon detecting the marker M with the marker number “6”, the automatic traveling device 1 changes the speed to 10 m/min and moves forward. Upon detecting the subsequent marker M with the marker number “7”, the automatic traveling device 1 pauses and performs an operation for coupling the cart 3. Subsequently, upon detecting the marker M with the marker number “8”, the automatic traveling device 1 switches to traveling control suitable for turning right, changes the speed to 20 m/min, and turns. Subsequently, upon detecting the marker M with the marker number “9”, the automatic traveling device 1 continues the traveling control suitable for turning right. Upon detecting the subsequent marker M with the marker number “1”, the automatic traveling device 1 switches to the traveling control suitable for the straight traveling. Finally, upon detecting the marker M with the marker number “2”, the automatic traveling device 1 stops and performs a charging operation.

As described above, the automatic traveling device 1 performs automatic traveling based on the preset course and the control information D1. Note that in some cases, an entire course is configured with the magnetic tape, but in other cases, the magnetic tape is used only in places that require high precision such as when coupling with a cart and docking with an automatic charger, and the automatic traveling device 1 travels on a virtual route formed by self-position estimation in other places, thereby providing a highly flexible autonomous traveling.

Here, a specific example of the coupling operation for coupling the cart 3 will be described. The automatic traveling device 1 is capable of towing the cart 3 that includes freely rotatable casters (wheels). As illustrated in FIG. 1, the automatic traveling device 1 includes the coupling device 2 for coupling the cart 3. The automatic traveling device 1 can couple the cart 3 with the coupling device 2 at a predetermined coupling operation position while traveling on a set course (see FIG. 6), and then travel while towing the cart 3. Note that the cart 3 is placed in advance at the coupling operation position. For example, when the vehicle controller 11 detects the marker M (marker number “7” illustrated in FIG. 4) associated with information indicating the operation for coupling the cart 3, the vehicle controller 11 pauses the automatic traveling device 1 at the coupling operation position and outputs a coupling operation command (drive signal) to the coupling device 2. The vehicle controller 11 is an example of an output processor of the disclosure.

Upon receiving the drive signal (coupling operation command), the coupling device 2 performs the coupling operation. As illustrated in FIG. 1, the coupling device 2 is installed on the rear side (or the front side) of the top plate of the automatic traveling device 1. As illustrated in FIG. 2, the coupling device 2 includes a coupling controller 21, a coupling motor 22 (an example of a drive motor of the disclosure), a gear mechanism 23, a coupling arm 24, and the like. The coupling motor 22, the gear mechanism 23, and the coupling arm 24 are housed in a housing 20 (cover) (see FIG. 1).

The coupling controller 21 functions as the various processors by executing the various types of processing in accordance with the control programs using the CPU. Further, some or all of the processors may be composed of an electronic circuit. Note that the control programs may be programs for causing multiple processors to function as the processors. The coupling controller 21 controls operations of the coupling device 2. For example, upon acquiring a coupling operation command (drive signal) from the vehicle controller 11, the coupling controller 21 drives the coupling motor 22, the gear mechanism 23, and the coupling arm 24 to perform the coupling operation. The coupling controller 21 is an example of a controller of the disclosure.

To be specific, when the automatic traveling device 1 reaches a predetermined coupling operation position, the coupling controller 21 drives the coupling motor 22 to rotate the gear mechanism 23, thereby moving the coupling arm 24 from the non-coupling position (see FIG. 1) to the coupling position (see FIG. 6) at which the coupling arm 24 is coupled to the cart 3.

Figure 7:
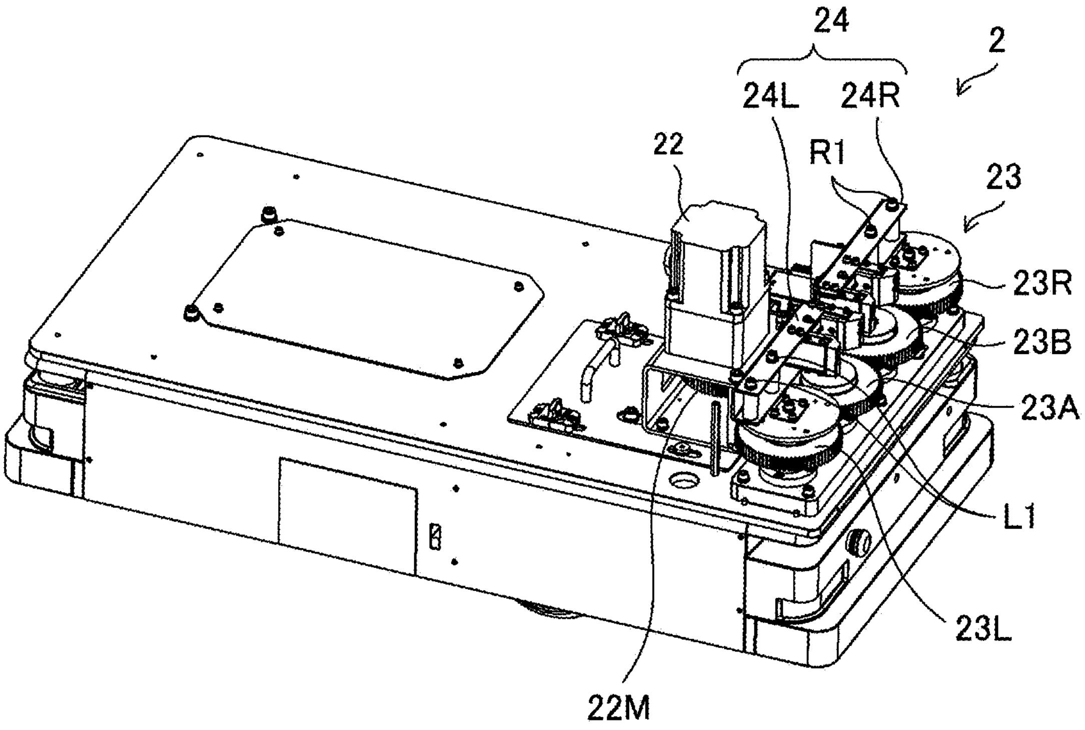
FIG. 7 is a perspective view illustrating an internal structure of a coupling device according to the embodiment of the disclosure in a non-coupling position.
Figure 8:
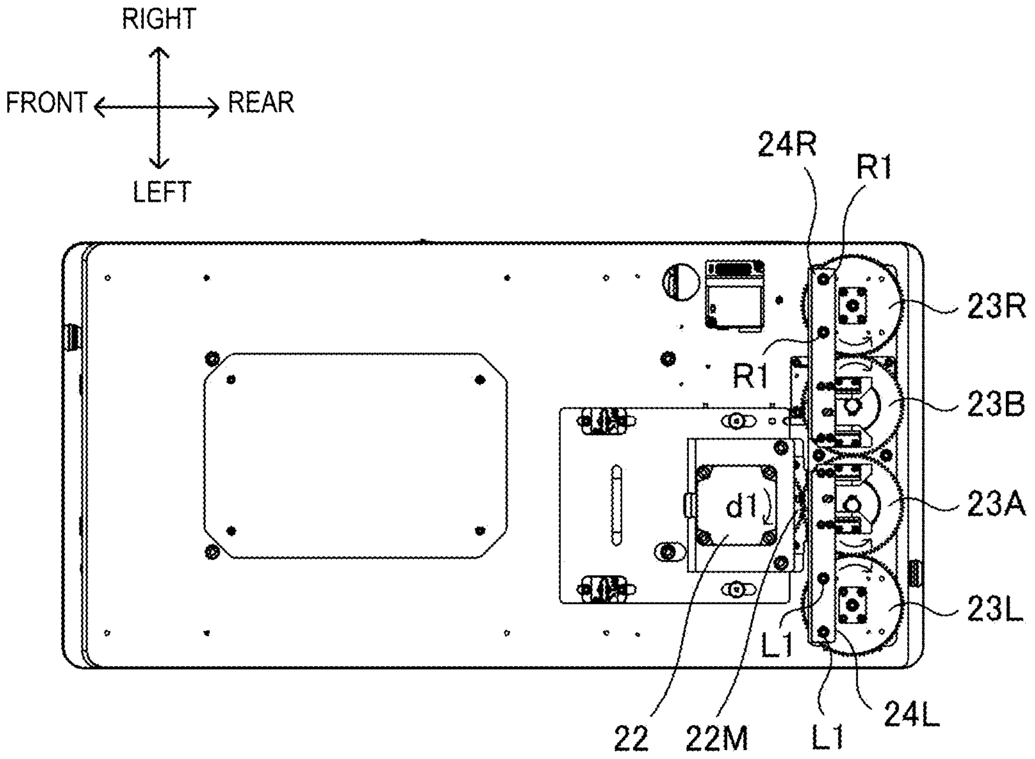
FIG. 8 is a plan view illustrating the internal structure of the coupling device according to the embodiment of the disclosure in the non-coupling position.
Figure 9:
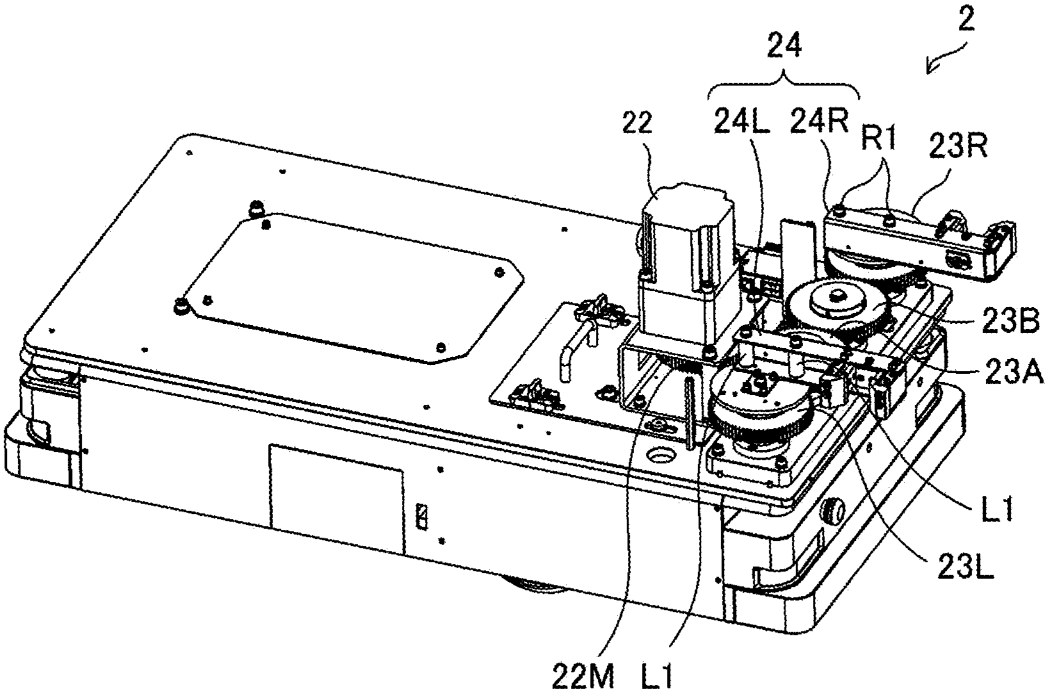
FIG. 9 is a perspective view illustrating an internal structure of the coupling device according to the embodiment of the disclosure in a coupling position.
Figure 10:
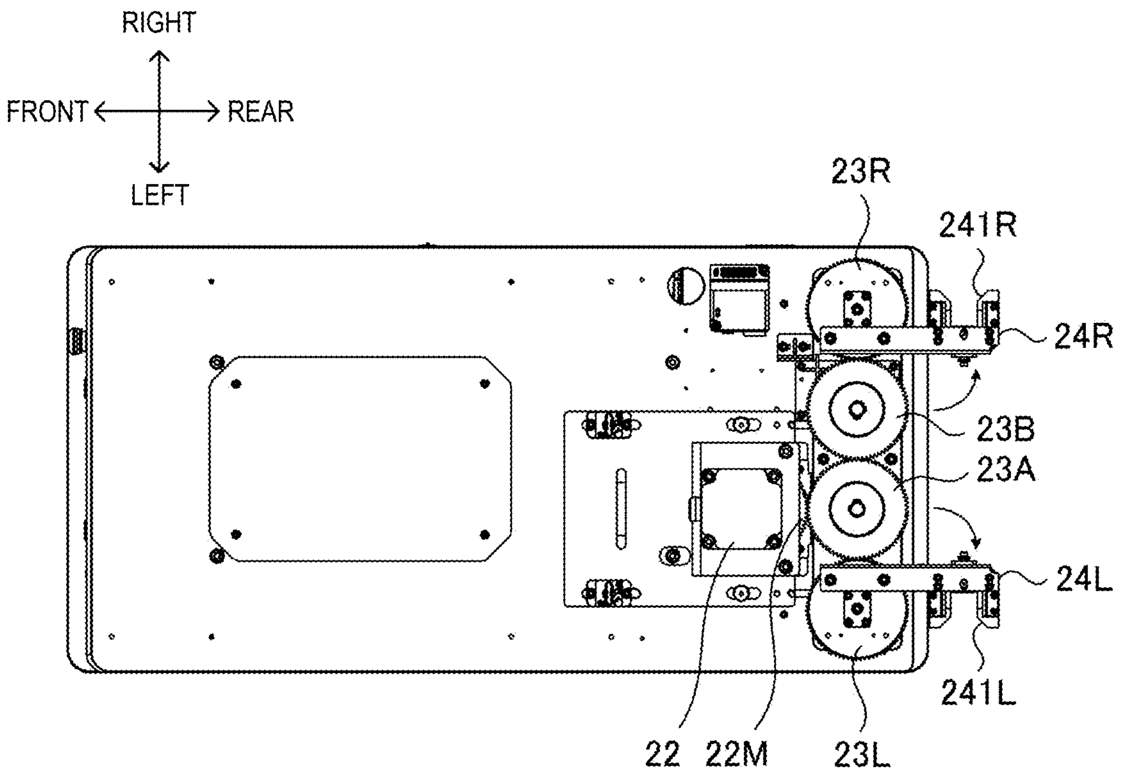
FIG. 10 is a plan view illustrating the internal structure of the coupling device according to the embodiment of the disclosure in the coupling position.
Figure 11A:
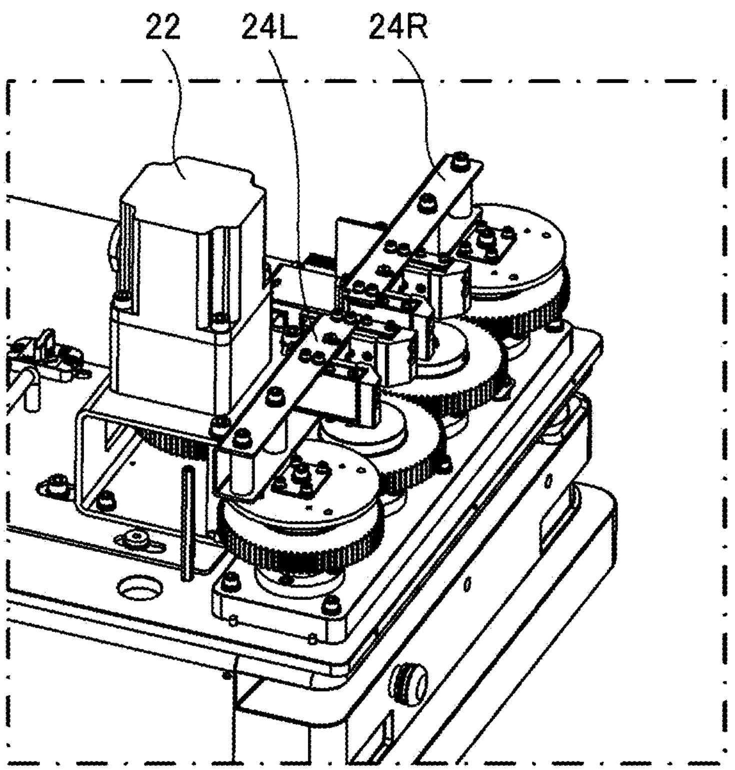
FIG. 11A is a partially enlarged view of the coupling device according to the embodiment of the disclosure in the non-coupling position.
Figure 11B:
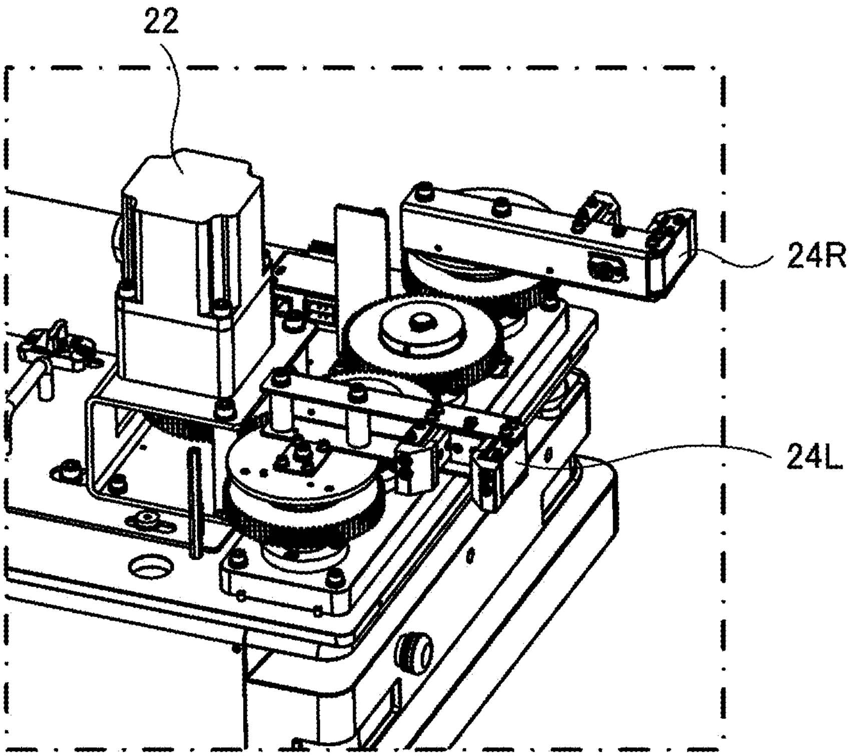
FIG. 11B is a partially enlarged view of the coupling device according to the embodiment of the disclosure in the coupling position.

FIG. 7 illustrates an internal structure of the coupling device 2 in the non-coupling position (non-coupling posture) with the housing 20 removed. FIG. 8 illustrates a plan view (top view) of the internal structure of FIG. 7. FIG. 9 illustrates an internal structure of the coupling device 2 in the coupling position (coupling posture) with the housing 20 removed. FIG. 10 illustrates a plan view (top view) of the internal structure of FIG. 9. FIG. 11A illustrates a partially enlarged view in the non-coupling position, and FIG. 11B illustrates a partially enlarged view in the coupling position.

The coupling motor 22 includes a gear 22M attached to a rotary shaft, and rotates the gear 22M in accordance with a command from the coupling controller 21. The gear 22M rotates horizontally, that is, rotates clockwise and counterclockwise when the automatic traveling device 1 is viewed from above.

The gear mechanism 23 is placed so as to mesh with the gear 22M of the coupling motor 22, and rotates in conjunction with the rotation of the gear 22M. To be specific, the gear mechanism 23 includes a left gear 23L located on the left side in the traveling direction and a right gear 23R located on the right side in the traveling direction when the automatic traveling device 1 is viewed from above, and the left gear 23L and the right gear 23R are arranged to directly or indirectly mesh with each other so as to rotate in conjunction with each other.

For example, as illustrated in FIG. 7 and FIG. 8, the gear mechanism 23 includes the left gear 23L and the right gear 23R, and an inner gear 23A and an inner gear 23B positioned between the left gear 23L and the right gear 23R. The left gear 23L, the inner gear 23A, the inner gear 23B, and the right gear 23R are arranged linearly in this order in the left-right direction (an example of a first direction of the disclosure). That is, the left gear 23L, the inner gear 23A, the inner gear 23B, and the right gear 23R are arranged linearly in a direction orthogonal to the traveling direction of the automatic traveling device 1. The inner gear 23A is an example of a first inner gear of the disclosure, and the inner gear 23B is an example of a second inner gear of the disclosure.

The left gear 23L and the inner gear 23A are arranged to mesh with each other, the inner gear 23A and the inner gear 23B are arranged to mesh with each other, and the inner gear 23B and the right gear 23R are arranged to mesh with each other. The gear 22M, the left gear 23L, the inner gear 23A, the inner gear 23B, and the right gear 23R are each arranged to rotate horizontally.

The coupling motor 22 is connected to the inner gear 23A. In other words, the gear 22M and the inner gear 23A are arranged to mesh with each other. Note that the coupling motor 22 may be connected to the inner gear 23B, and the gear 22M and the inner gear 23B may be arranged to mesh with each other.

The coupling arm 24 includes a left coupling arm 24L connected to the left gear 23L and a right coupling arm 24R connected to the right gear 23R. As illustrated in FIG. 7 and FIG. 8, one end of the left coupling arm 24L is fixed to an upper surface of the left gear 23L by fixing members L1 such as bolts, and one end of the right coupling arm 24R is fixed to an upper surface of the right gear 23R by fixing members R1 such as bolts.

The coupling controller 21 drives the coupling motor 22 to rotate the left gear 23L, the inner gear 23A, the inner gear 23B, and the right gear 23R in conjunction with each other, thereby moving the left coupling arm 24L and the right coupling arm 24R from the non-coupling position (see FIGS. 7 and 8) to the coupling position (see FIGS. 9 and 10). For example, as illustrated in FIG. 8, the coupling controller 21 drives the coupling motor 22 to rotate the gear 22M in a d1 direction (clockwise). Thus, the inner gear 23A meshing with the gear 22M rotates in an arrow direction (counterclockwise), the left gear 23L meshing with the inner gear 23A rotates in an arrow direction (clockwise), the inner gear 23B meshing with the inner gear 23A rotates in an arrow direction (clockwise), and the right gear 23R meshing with the inner gear 23B rotates in an arrow direction (counterclockwise).

Thus, the left coupling arm 24L fixed to the left gear 23L rotationally moves leftward from the center position in the left-right direction in accordance with the clockwise rotation of the left gear 23L (see FIG. 10, FIG. 11A, and FIG. 11B). Similarly, the right coupling arm 24R fixed to the right gear 23R rotationally moves rightward from the center position in the left-right direction in accordance with the counterclockwise rotation of the right gear 23R (see FIG. 10, FIG. 11A, and FIG. 11B).

Figure 6:
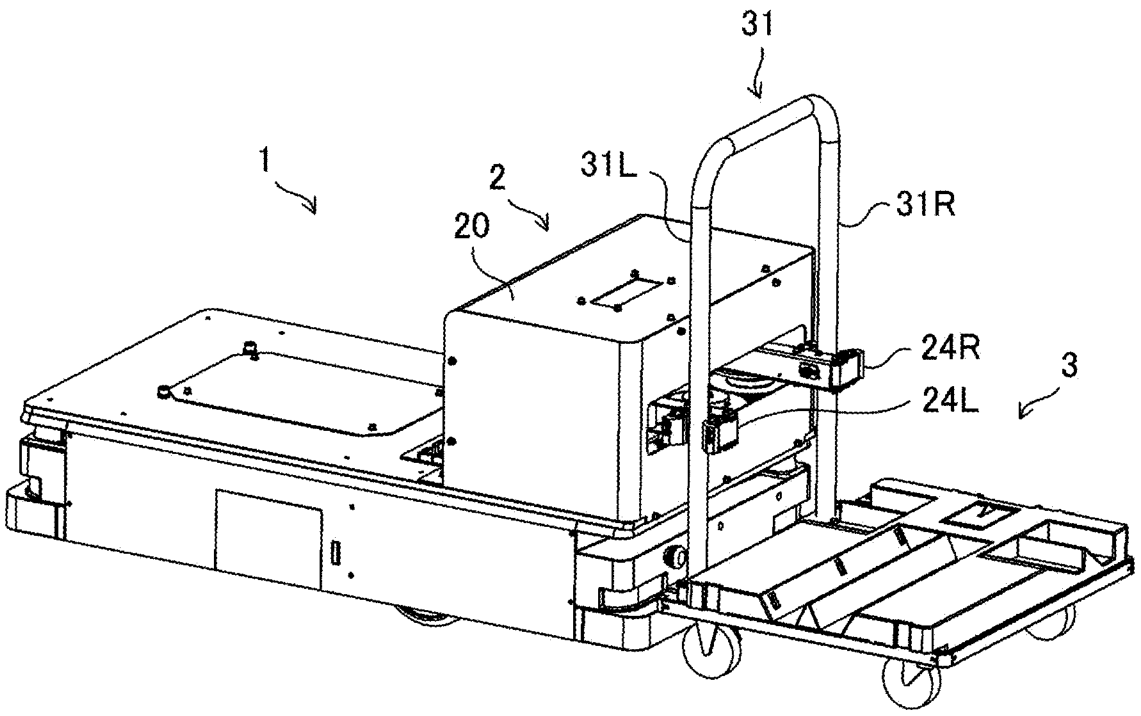
FIG. 6 is an external perspective view illustrating a coupling state of the automatic traveling device and a cart according to the embodiment of the disclosure.
Figure 12:
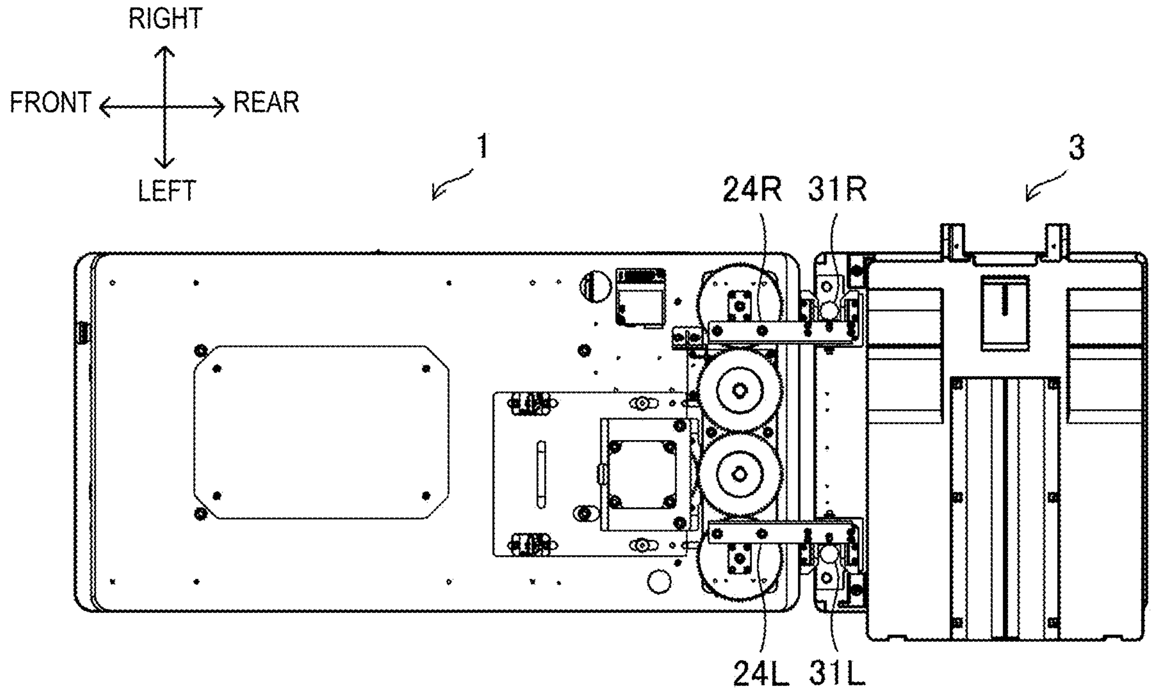
FIG. 12 is a plan view illustrating a coupling state of the coupling device and the cart according to the embodiment of the disclosure.

As illustrated in FIG. 12, when the left coupling arm 24L and the right coupling arm 24R rotationally move to the coupling position, the left coupling arm 24L and the right coupling arm 24R are coupled to the cart 3. To be specific, as illustrated in FIG. 6, the cart 3 includes a coupling portion 31 composed of a pipe-shaped member or a bar-shaped member. The coupling portion 31 includes a left coupling portion 31L and a right coupling portion 31R that extend vertically in the up-down direction. The left coupling portion 31L is located on the front (or rear) left side of the cart 3, and the right coupling portion 31R is located on the front (or rear) right side of the cart 3. The left coupling portion 31L and the right coupling portion 31R are located at a predetermined interval in the left-right direction.

The left coupling arm 24L includes a left hook portion 241L (see FIG. 10) at a tip portion thereof. When the left coupling arm 24L rotationally moves, the left hook portion 241L passes through a space between the left coupling portion 31L and the right coupling portion 31R of the cart 3, and the left hook portion 241L receives the left coupling portion 31L at the coupling position. Thus, the left coupling portion 31L is engaged with the left hook portion 241L (see FIG. 6 and FIG. 12).

The right coupling arm 24R includes a right hook portion 241R (see FIG. 10) at a tip portion thereof. When the right coupling arm 24R rotationally moves, the right hook portion 241R passes through the space between the left coupling portion 31L and the right coupling portion 31R of the cart 3, and the right hook portion 241R receives the right coupling portion 31R at the coupling position. Thus, the right coupling portion 31R is engaged with the right hook portion 241R (see FIG. 6 and FIG. 12). Thus, the coupling device 2 is coupled to the cart 3.

In this way, at the coupling position, the coupling controller 21 couples the left coupling arm 24L and the right coupling arm 24R to the cart 3 by rotationally moving the left coupling arm 24L and the right coupling arm 24R in directions away from each other. To be specific, the coupling controller 21 rotates the left gear 23L and the right gear 23R in opposite directions in conjunction with each other. For example, as illustrated in FIG. 8, the coupling controller 21 rotates the left gear 23L clockwise and rotates the right gear 23R counterclockwise. Thus, as illustrated in FIG. 10, at the coupling position, the coupling controller 21 couples the left coupling arm 24L and the right coupling arm 24R to the cart 3 by rotationally moving the left coupling arm 24L from the center to the left and by rotationally moving the right coupling arm 24R from the center to the right.

As described above, the coupling device 2 includes one coupling motor 22, and moves the coupling arm from the non-coupling position to the coupling position and couples the coupling arm to the cart 3 by rotating multiple gears directly or indirectly connected to the coupling motor 22 in conjunction with each other.

The coupling device 2 includes the housing 20, and the coupling motor 22 and the gear mechanism 23 are housed in the housing 20. The coupling arm 24 is housed in the housing 20 at the non-coupling position, and moves from the non-coupling position in the housing 20 to the coupling position outside the housing 20 in response to the rotational operation of the gear mechanism 23.

According to the above configuration, it is possible to couple the cart 3 with a simple structure. In addition, the automatic traveling device 1 can easily couple and tow the cart 3.

Note that when separating the cart 3 from the automatic traveling device 1, the vehicle controller 11 outputs a command (drive signal) for an uncoupling operation to the coupling device 2. For example, when the automatic traveling device 1 reaches a predetermined uncoupling position, the vehicle controller 11 pauses the automatic traveling device 1 at the uncoupling position and outputs an uncoupling command to the coupling device 2. Upon acquiring the uncoupling command from the vehicle controller 11, the coupling controller 21 rotates the gear 22M of the coupling motor 22 counterclockwise. Thus, the left gear 23L, the inner gear 23A, the inner gear 23B, and the right gear 23R rotate, and accordingly, the left coupling arm 24L and the right coupling arm 24R disengage from the coupling portion 31 of the cart 3, move from the coupling position (see FIG. 6) to the non-coupling position (see FIG. 1), and are housed in the housing 20.

Other Embodiments

The coupling device 2 of the disclosure is not limited to the embodiment described above, and may have the following configurations. In the gear mechanism 23, a predetermined gap (backlash) is provided between the gears meshing with each other to allow the gears to rotate smoothly. Therefore, when the coupling arm 24 is coupled to the cart 3 and the automatic traveling device 1 tows the cart 3, rattling may occur due to the backlash.

Figure 13A:
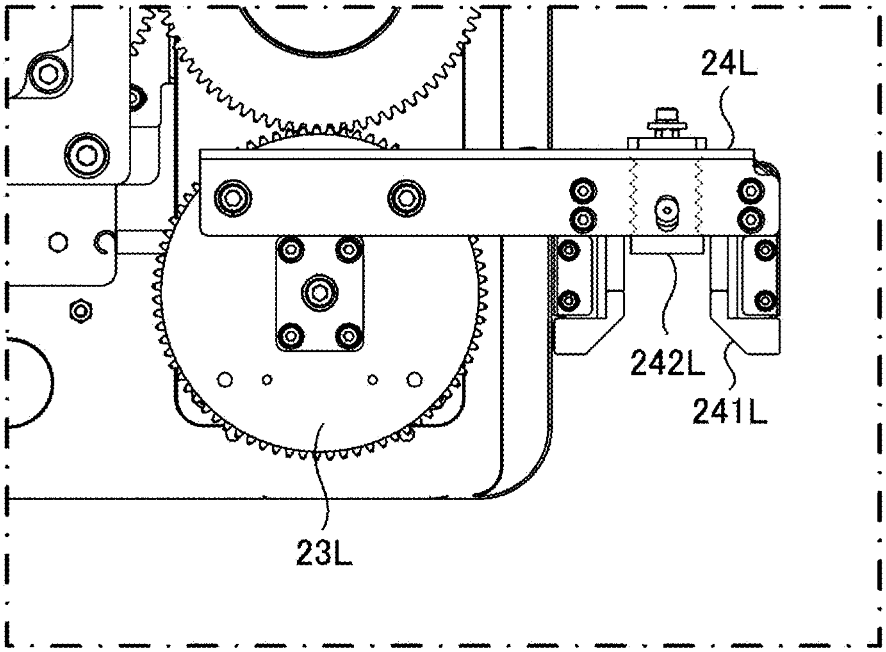
FIG. 13A is a partially enlarged view of a coupling device according to another embodiment of the disclosure in a non-coupling position.
Figure 13B:
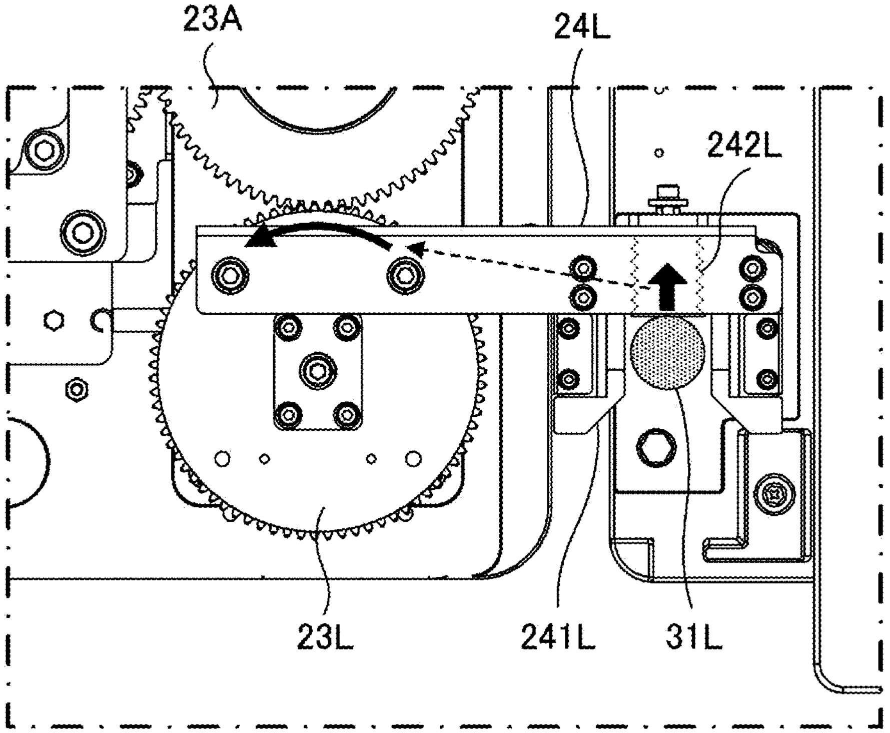
FIG. 13B is a partially enlarged view of the coupling device according to more another embodiment of the disclosure in a coupling position.

Therefore, the gear mechanism 23 may include a component for suppressing the rattling. For example, as illustrated in FIG. 13A, the left coupling arm 24L includes a spring 242L (an example of an elastic member of the disclosure) inside the left hook portion 241L at the tip portion thereof. The spring 242L is provided so as to apply a predetermined biasing force in the left direction at the coupling position. As illustrated in FIG. 13B, when the left hook portion 241L is engaged with the left coupling portion 31L at the coupling position, the coupling controller 21 drives the coupling motor 22 to rotate the gear mechanism 23 so that the spring 242L applies a predetermined pressing force against the biasing force to the left coupling portion 31L. Accordingly, the pressing force acts on the left gear 23L via the left coupling arm 24L, making it possible to suppress the rattling between the left gear 23L and the inner gear 23A. The same applies to the right coupling arm 24R.

In the embodiment described above, the gear mechanism 23 includes four gears (the left gear 23L, the inner gear 23A, the inner gear 23B, and the right gear 23R). In another embodiment, the gear mechanism 23 may include two gears, the left gear 23L and the right gear 23R. In this case, the left gear 23L and the right gear 23R are arranged so as to mesh with each other, and the left gear 23L or the right gear 23R is arranged so as to mesh with the gear 22M of the coupling motor 22.

That is, the coupling device 2 may be configured such that the left gear 23L and the right gear 23R are arranged side by side in the left-right direction (first direction) and meshed with each other, the coupling motor 22 is connected to the left gear 23L or the right gear 23R, and the coupling arm 24 includes the left coupling arm 24L connected to the left gear 23L and the right coupling arm 24R connected to the right gear 23R. In this case, the coupling controller 21 drives the coupling motor 22 to rotate the left gear 23L and the right gear 23R in conjunction with each other, thereby moving the left coupling arm 24L and the right coupling arm 24R from the non-coupling position to the coupling position.

In the embodiment described above, the left gear 23L, the inner gear 23A, the inner gear 23B, and the right gear 23R are arranged linearly in the left-right direction, and the cart 3 is coupled to the rear (or front) of the automatic traveling device 1. In another embodiment, the left gear 23L, the inner gear 23A, the inner gear 23B, and the right gear 23R may be arranged linearly in the front-rear direction, and the cart 3 may be coupled to a side (left side or right side) of the automatic traveling device 1.

In the embodiment described above, the left coupling arm 24L and the right coupling arm 24R are coupled to the cart 3 by rotationally moving the left coupling arm 24L and the right coupling arm 24R in directions away from each other from the inside to the outside. In another embodiment, the left coupling arm 24L and the right coupling arm 24R may be coupled to the cart 3 by rotationally moving the left coupling arm 24L and the right coupling arm 24R in directions from the outside to the inside so that the left coupling arm 24L and the right coupling arm 24R approach each other. For example, in FIG. 8, by locating the hook portions of the left coupling arm 24L and the right coupling arm 24R in an opposite direction in the front-rear direction, and configuring the gear 22M of the coupling motor 22 to rotate counterclockwise, it is possible to reverse the coupling direction (the coupling portion 31 of the cart 3 can be coupled so as to be sandwiched from the left and right outer sides).

In the embodiment described above, the gear 22M of the coupling motor 22 is arranged so as to mesh with the inner gear 23A or the inner gear 23B. In another embodiment, the gear 22M may be arranged to mesh with the left gear 23L or the right gear 23R. In more another embodiment, the coupling device 2 may include multiple coupling motors 22 or may include multiple gears 22M.

The left gear 23L, the inner gear 23A, the inner gear 23B, and the right gear 23R may be of the same size or may be of different sizes. For example, the inner gear 23A and the inner gear 23B may be of the same size, and the left gear 23L and the right gear 23R may be of the same size and may be larger than the inner gear 23A and the inner gear 23B.

In the embodiment described above, an example has been described in which the coupling device 2 is applied to the automatic traveling device 1. However, the coupling device of the disclosure can also be used for other applications.

SUPPLEMENTARY NOTES OF DISCLOSURE

Hereinafter, an outline of the disclosure extracted from the above-described embodiments will be described as supplementary notes. Note that configurations and processing functions described in the following supplementary notes can be selected and combined as desired.

Supplementary Note 1

A coupling device mounted on an automatic traveling device and capable of coupling a towed vehicle, the coupling device includes a drive motor, a gear mechanism connected to the drive motor, a coupling arm connected to the gear mechanism, and a controller that drives the drive motor, in which in a case where the automatic traveling device reaches a coupling operation position predetermined, the controller moves the coupling arm from a non-coupling position to a coupling position at which the coupling arm is coupled to the towed vehicle by driving the drive motor and rotating the gear mechanism.

Supplementary Note 2

In the coupling device according to supplementary note 1, the gear mechanism includes a left gear located on a left side and a right gear located on a right side, when viewing the automatic traveling device from above, and by arranging the left gear and the right gear meshing with each other directly or indirectly, the left gear and the right gear rotate in conjunction with each other.

Supplementary Note 3

In the coupling device according to supplementary note 2, the left gear and the right gear are arranged side by side in a first direction and are in mesh with each other, the drive motor is connected to the left gear or the right gear, the coupling arm includes a left coupling arm connected to the left gear and a right coupling arm connected to the right gear, and the controller moves each of the left coupling arm and the right coupling arm from the non-coupling position to the coupling position by driving the drive motor and rotating the left gear and the right gear in conjunction with each other.

Supplementary Note 4

In the coupling device according to supplementary note 2, the gear mechanism further includes a first inner gear and a second inner gear positioned between the left gear and the right gear, the left gear, the first inner gear, the second inner gear, and the right gear are arranged linearly in a first direction in this order, the left gear and the first inner gear are arranged to mesh with each other, the first inner gear and the second inner gear are arranged to mesh with each other, and the second inner gear and the right gear are arranged to mesh with each other, the drive motor is connected to the first inner gear or the second inner gear, the coupling arm includes a left coupling arm connected to the left gear and a right coupling arm connected to the right gear, and the controller moves each of the left coupling arm and the right coupling arm from the non-coupling position to the coupling position by driving the drive motor and rotating the left gear, the first inner gear, the second inner gear, and the right gear in conjunction with each other.

Supplementary Note 5

In the coupling device according to supplementary note 3 or 4, the first direction is a direction orthogonal to a traveling direction of the automatic traveling device.

Supplementary Note 6

In the coupling device according to any one of supplementary notes 3 to 5, the controller couples the left coupling arm and the right coupling arm to the towed vehicle by rotationally moving the left coupling arm and the right coupling arm in directions away from each other at the coupling position.

Supplementary Note 7

In the coupling device according to any one of supplementary notes 2 to 6, the controller rotates the left gear and the right gear in opposite directions in conjunction with each other.

Supplementary Note 8

In the coupling device according to any one of supplementary notes 1 to 7, the coupling arm includes a hook portion with which a coupling portion of the towed vehicle is engaged, and an elastic member provided on the hook portion, and in a case where the hook portion is engaged with the coupling portion at the coupling position, the controller causes the elastic member to apply a pressing force predetermined to the coupling portion by driving the drive motor and rotating the gear mechanism.

Supplementary Note 9

In the coupling device according to any one of supplementary notes 1 to 8, the coupling device includes a housing, in which the drive motor and the gear mechanism are housed in the housing, and the coupling arm is housed in the housing at the non-coupling position, and moves from the non-coupling position in the housing to the coupling position outside the housing in response to a rotational operation of the gear mechanism.

Supplementary Note 10

An automatic traveling device includes a coupling device including a drive motor, a gear mechanism connected to the drive motor, a coupling arm connected to the gear mechanism, and a controller that drives the drive motor, and being capable of coupling a towed vehicle. The automatic traveling device includes an output processor that outputs a drive signal to the coupling device in a case where the automatic traveling device reaches a coupling operation position at which an operation of coupling the towed vehicle is performed, in which in a case where the controller receives the drive signal, the controller moves the coupling arm from a non-coupling position to a coupling position at which the coupling arm is coupled to the coupling portion of the towed vehicle by driving the drive motor and rotating the gear mechanism.

Supplementary Note 11

A coupling method for coupling a coupling device to a towed vehicle, the coupling device including a drive motor, a gear mechanism connected to the drive motor, a coupling arm connected to the gear mechanism, and a controller that drives the drive motor, the coupling method being executed by one or more processors includes in a case where an automatic traveling device reaches a coupling operation position at which the automatic traveling device performs an operation of coupling the towed vehicle, outputting a drive signal to the coupling device, and in a case where the controller receives the drive signal, moving the coupling arm from a non-coupling position to a coupling position at which the coupling arm is coupled to a coupling portion of the towed vehicle by driving the drive motor and rotating the gear mechanism.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A coupling device mounted on an automatic traveling device and capable of coupling a towed vehicle, the coupling device comprising:

a drive motor;

a gear mechanism connected to the drive motor;

a coupling arm connected to the gear mechanism; and a controller that drives the drive motor, wherein:

in a case that the automatic traveling device reaches a predetermined coupling operation position, the controller moves the coupling arm from a non-coupling position to a coupling position at which the coupling arm is coupled to the towed vehicle by driving the drive motor and rotating the gear mechanism, the gear mechanism includes a left gear located on a left side, and a right gear located on a right side, when viewing the automatic traveling device from above, and the left gear and the right gear rotate in conjunction with each other by arranging the left gear and the right gear to mesh with each other directly or indirectly.

2. The coupling device according to claim 1, wherein:

the left gear and the right gear are arranged side by side in a first direction and are in mesh with each other, the drive motor is connected to the left gear or the right gear, the coupling arm includes a left coupling arm connected to the left gear and a right coupling arm connected to the right gear, and the controller moves each of the left coupling arm and the right coupling arm from the non-coupling position to the coupling position by driving the drive motor and rotating the left gear and the right gear in conjunction with each other.

3. The coupling device according to claim 1, wherein:

the gear mechanism further includes a first inner gear and a second inner gear positioned between the left gear and the right gear, the left gear, the first inner gear, the second inner gear, and the right gear are arranged linearly in a first direction in this order, the left gear and the first inner gear are arranged to mesh with each other, the first inner gear and the second inner gear are arranged to mesh with each other, and the second inner gear and the right gear are arranged to mesh with each other, the drive motor is connected to the first inner gear or the second inner gear, the coupling arm includes a left coupling arm connected to the left gear and a right coupling arm connected to the right gear, and the controller moves each of the left coupling arm and the right coupling arm from the non-coupling position to the coupling position by driving the drive motor and rotating the left gear, the first inner gear, the second inner gear, and the right gear in conjunction with each other.

4. The coupling device according to claim 2, wherein the first direction is a direction orthogonal to a traveling direction of the automatic traveling device.

5. The coupling device according to claim 2, wherein the controller couples the left coupling arm and the right coupling arm to the towed vehicle by rotationally moving the left coupling arm and the right coupling arm in directions away from each other at the coupling position.

6. The coupling device according to claim 1, wherein the controller rotates the left gear and the right gear in opposite directions in conjunction with each other.

7. The coupling device according to claim 1, wherein:

the coupling arm includes a hook portion with which a coupling portion of the towed vehicle is engaged, and an elastic member provided on the hook portion, and in a case that the hook portion is engaged with the coupling portion at the coupling position, the controller causes the elastic member to apply a predetermined pressing force to the coupling portion by driving the drive motor and rotating the gear mechanism.

8. The coupling device according to claim 1, further comprising:

a housing, wherein:

the drive motor and the gear mechanism are housed in the housing, and the coupling arm is housed in the housing at the non-coupling position, and moves from the non-coupling position in the housing to the coupling position outside the housing in response to a rotational operation of the gear mechanism.

9. An automatic traveling device comprising:

a coupling device capable of coupling a towed vehicle, the coupling device including:

a drive motor, a gear mechanism connected to the drive motor, a coupling arm connected to the gear mechanism, and a controller that drives the drive motor; and an output processor that outputs a drive signal to the coupling device in a case that the automatic traveling device reaches a coupling operation position at which an operation of coupling the towed vehicle is performed, wherein:

in a case that the controller receives the drive signal, the controller moves the coupling arm from a non-coupling position to a coupling position at which the coupling arm is coupled to a coupling portion of the towed vehicle by driving the drive motor and rotating the gear mechanism, the gear mechanism includes a left gear located on a left side, and a right gear located on a right side, when viewing the automatic traveling device from above, and the left gear and the right gear rotate in conjunction with each other by arranging the left gear and the right gear to mesh with each other directly or indirectly.

* * * * *